United States Patent [19]

Borden

[11] Patent Number: 5,142,812
[45] Date of Patent: Sep. 1, 1992

[54] FISH ATTRACTOR

[76] Inventor: Stephen Borden, 2144 Ferndale Road, Victoria, B.C., V8N 2Z1, Canada

[21] Appl. No.: 751,989

[22] Filed: Aug. 29, 1991

[51] Int. Cl.⁵ ............................................. A01K 91/00
[52] U.S. Cl. ................................... 43/43.1; 43/43.13; 43/44.92
[58] Field of Search .................. 43/43.1, 43.13, 43.15, 43/27.4, 44.92

[56] References Cited

U.S. PATENT DOCUMENTS

| 2,637,134 | 5/1953 | Davidson . | |
| 3,656,253 | 4/1972 | Gaunt . | |
| 4,380,131 | 4/1983 | Lazan | 43/43.13 X |
| 4,524,535 | 6/1985 | Bates | 43/43.13 X |
| 4,546,565 | 10/1985 | Blevins | 43/43.13 |

FOREIGN PATENT DOCUMENTS

| 1044017 | 12/1978 | Canada . | |
| 1114162 | 12/1981 | Canada . | |
| 3115219 | 11/1982 | Fed. Rep. of Germany | 43/43.13 |
| 0191993 | 1/1923 | United Kingdom | 43/43.13 |
| 2206021 | 12/1988 | United Kingdom | 43/43.1 |

Primary Examiner—Richard K. Seidel
Assistant Examiner—Patty E. Hong

[57] ABSTRACT

A fish attracting device has a straight main shaft ending in a curved portion on one end and a hinged connection to a shorter shaft on the other end. The shorter shaft rotates about the hinge in a plane offset from the plane of the curved portion to induce rotation of the device when pulled through the water by the curved portion end. A fishing lure can be attached to the end of the shorter shaft, and the magnitude of the rotation of the device is a function of the angular setting of the shorter shaft.

4 Claims, 1 Drawing Sheet

{ 5,142,812 }

FISH ATTRACTOR

FIELD OF THE INVENTION

This invention relates to a device for attracting fish. More particularly, the invention relates to a device for transmitting movement to a lure or bait on a fishing line to simulate the movement of a stricken fish.

BACKGROUND OF THE INVENTION

It is known in the art of fishing lures to use flashers and dodgers to attract fish and to simulate the movement of a fish. Such flashers or dodgers typically consist of a basically flat surface with asymmetrical bends and contours such that the lure has an erratic motion when pulled through the water. Such devices are exemplified by Canadian Pat. No. 1,114,162 to Wetherald and Canadian Pat. No. 928,068 to Gaunt.

The movement of such prior art devices is principally determined by the speed with which the devices are pulled through the water. Because of the flat surfaces in the devices, they present a fairly large surface area of resistance to a fighting fish such that when the fish is only marginally hooked and jerking sideways, there is a tendency for the hook to tear out of the fish's mouth and thus to escape. There is also the potential for fish fighting against these prior art devices to tire more readily than against this invention. In sports fishing, most anglers prefer to extend the ability of the fish to fight to near its full potential.

It is therefore an object of this invention to provide a device for imparting to a lure or bait a movement like that of a stricken fish and which presents relatively low surface area of resistance to a fighting fish.

It is also an object of the invention to provide such a device which allows the user thereof to control the scope of movement of the lure or bait.

SUMMARY OF THE INVENTION

The invention, in its preferred construction, includes a rigid elongated main shaft. One end of the main shaft has a curved portion. The free end of the curved portion includes means for attaching a line thereto, for example for trolling the device through the water. The opposite end of the main shaft includes a hinge connecting the main shaft to a rigid short shaft. The short shaft is adapted to rotate about the hinge in a plane which is angularly offset from the plane of the curved portion. The hinged connection includes means for adjusting the angular position of the short shaft with respect to the main shaft in a yieldable manner. The free end of the short shaft includes means for attaching a line thereto, to which line a fishing lure or bait of a conventional type may be attached.

BRIEF DESCRIPTION OF THE DRAWINGS

The invention will be more fully appreciated by reference to a preferred embodiment thereof and to the drawings in which.

DETAILED DESCRIPTION OF THE PREFERRED EMBODIMENTS

Figure 1:
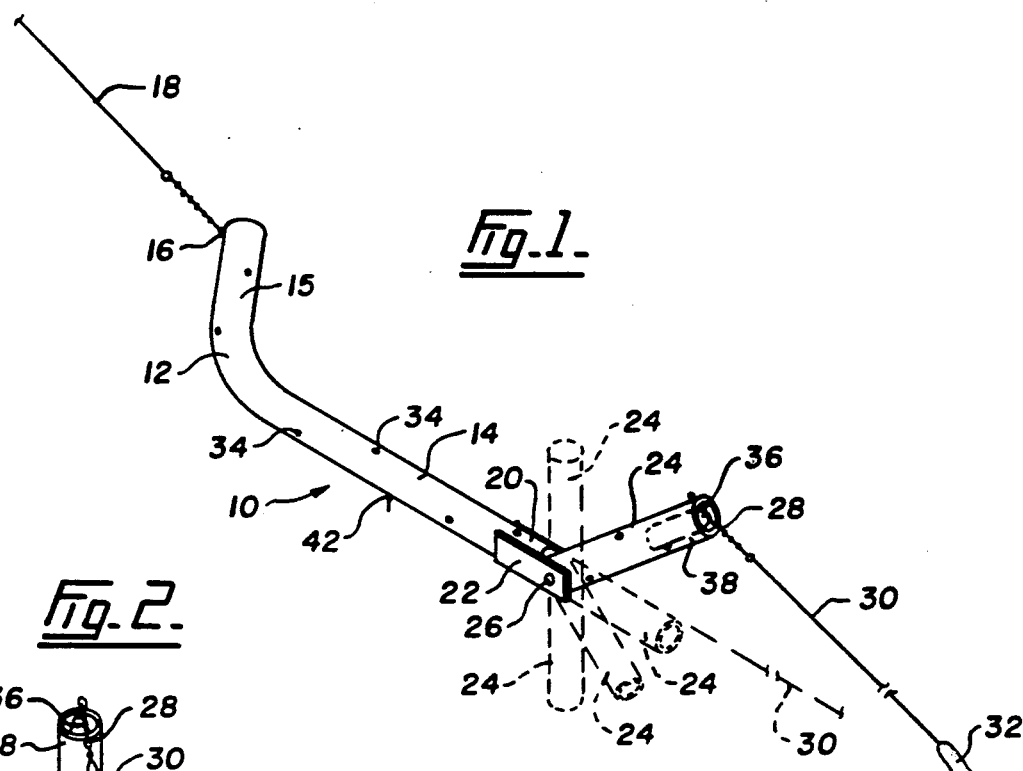
FIG. 1 is a perspective view of a preferred embodiment of the invention illustrating a plurality of positions of the short shaft about the hinge.

Referring to FIG. 1, the device according to the invention includes a generally elongated and rigid main shaft 10, with one end thereof being curved as at 12, and the remainder thereof being substantially straight as at 14. The free end of the curved portion 15 includes an eyelet 16 best seen in FIG. 1, for attachment of a trolling line 18 therethrough.

The end 20 of the substantially straight portion 14 of the main shaft 10 includes hinge brackets (only one of which is visible as indicated by the numeral 22) for hinged connection to a substantially straight rigid shaft 24 which is shorter than the main shaft 10. The hinged connection may be of any known means, such as for example a pair of parallel arms secured to the short shaft 24 by means of bolts and wing nut at 26, so as to allow the setting of any desired angle between the short shaft 24 and the main shaft 10 by adjustment of the angle and tightening of the wing nut.

Figure 2:
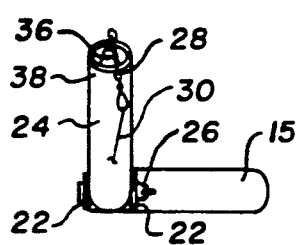
FIG. 2 is an end front view of a preferred embodiment of the invention.

The straight portion 14 and the curved portion 15 lie in a common plane. The hinge brackets 22 are oriented such that the plane of rotation of the short shaft 24 about the hinge is different from the common plane of straight portion 14 and curved portion 15, both planes being angularly offset from one another. This feature is best appreciated by reference to FIG. 2.

The free end of the short shaft 24 includes an eyelet or other suitable means for attachment of a line 30 therethrough as at 28. Fishing bait or a lure 32 may be attached to the end of the line 30.

In the preferred embodiment of the device, the main shaft 10 and the short shaft 24 are both of hollow tubular construction and holes 34 are provided at various points. This minimizes the resistance of the device to movement through water in both the forward and lateral directions. The holes also allow any trapped air to escape from the tubular device and permit its rapid submersion as well as quick drainage when pulled out of the water. The tubular construction of the main shaft 10 and of the short shaft 24 allow the insertion of a colour dispensing cartridge 36 therein. In FIG. 1 the dispensing cartridge 36 is inserted in the trailing end 38 of the short shaft 24. As the device is pulled through the water, dye may be released from the dispensing cartridge 36 to simulate blood.

The wing nuts 26 can be tightened to an appropriate tension so as to hold firmly the angle between the main shaft 10 and short shaft 24 while trolling, while however allowing the angle to yield when a fish strikes the bait or lure 32.

The operation of the device is as follows. As the device is pulled through the water by the line 18, the tubular construction of the device and the asymmetrical relationship between the curved portion 15 and the short shaft 24 (the asymmetry being produced by the angularly offset planes) causes the device to rotate fully in a crank-like and eccentric manner thereby transmitting a revolving action to the trailing bait or lure 32. Increasing the angle between the short shaft 24 and the main shaft 10 results in a slower rotation. If the short shaft 24 is aligned with the main shaft 10, rotation ceases altogether. As a result, by adjusting the angle of the short shaft 24, one can achieve either no rotation, a mere wobble, or a broad rotation as the device is pulled through the water.

The angle between the short shaft 24 and the main shaft 10 may also be set to an angle of over 180° to reverse the direction of rotation and crank-like movement to thereby counteract the effect of tides or currents or of winds if fishing near the surface. This also allows the device to be set to rotate in the same direction as lure or bait that have a preset direction of rotation.

When a fish strikes the bait or lure 32, thereby pulling the line 30 against the yieldable hinge connection, this will tend to align the short shaft 24 with the main shaft 10 with the result that the tug on the line 30 by the fish will be less abrupt. This reduces the chances of snapping the line 30.

Figure 3:
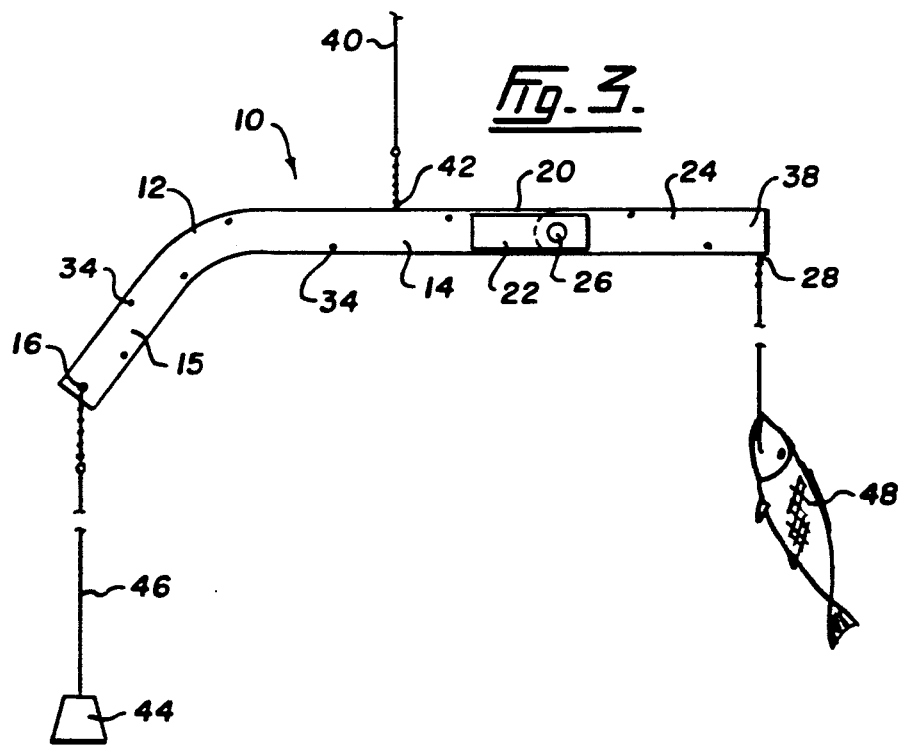
FIG. 3 is a side view of a preferred embodiment of the invention in its alternate use for bottom fishing.

FIG. 3 illustrates the use of the device for jigging for bottom fish.

In such use, a suspension or tugging line 40 is disposed at substantially a fulcrum point 42 of the device 10. A weight 44 is attached to the line 46 which is secured to eyelet 16. The length of the line 46 will determine how high from the bottom the device, and consequently the bait 48, will be suspended. This feature makes bottom fishing considerably easier than the usual method of estimating depth by the length of the line and jigging up from an estimated suspension height. In such usage, the short shaft 24 will typically be aligned with the main shaft 10 in a secure connection.

Although the present invention has been described in some detail by way of example for purposes of clarity and understanding, it will be apparent that certain changes and modifications may be practised within the scope of the appended claims.

I claim:

1. A fish attracting device comprising a first rigid elongated shaft having a substantially straight portion and a curved portion at one end of the straight portion, the said straight portion and curved portion lying in a first plane, the other end of the straight portion terminating in a hinged connection to a second rigid shaft which is straight and shorter than the first shaft and which is rotatable about the hinged connection in a second plane, said second plane being different from and angularly offset from said first plane, means for holding said second shaft at a given angle in relation to the first shaft said means being yieldable under the effect of a pull on the second shaft, means for securing a line to the free end of the curved portion, and means of securing a line to the free end of the second shaft.

2. Apparatus as in claim 1 wherein the first and second shafts are of hollow tubular construction and include a plurality of holes therethrough.

3. Apparatus as in claim 1 or 2 including means for attaching a line at substantially the fulcrum of the apparatus.

4. Apparatus as in claim 1 or 2 including means for securing a cartridge dispenser in a trailing end of the second shaft.

* * * * *